United States Patent
Allen

(10) Patent No.: US 6,259,864 B1
(45) Date of Patent: Jul. 10, 2001

(54) EXPOSURE COUNT INDICATOR FOR CAMERA

(75) Inventor: Loretta E. Allen, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/443,517

(22) Filed: Nov. 19, 1999

(51) Int. Cl.[7] .............................. G03B 1/66; G01D 13/04; G02B 27/02; G02B 5/22

(52) U.S. Cl. ..................... 396/284; 116/213; 116/298; 116/302; 359/436; 359/890; 359/889

(58) Field of Search ..................... 396/281, 284; 116/298, 318, 302, 317, 213; 359/436, 890, 887, 892, 885, 889

(56) References Cited

U.S. PATENT DOCUMENTS

| | | | |
|---|---|---|---|
| 1,218,082 | 3/1917 | Hall | 40/443 |
| 1,285,753 | 11/1918 | Lowenstein | 352/81 |
| 1,422,527 | 7/1922 | Berger | 359/464 |
| 2,548,530 | 4/1951 | Harvey | 396/396 |
| 2,588,054 | 3/1952 | Smith | 396/388 |
| 2,619,932 | 12/1952 | Brewster | 116/257 |
| 2,621,866 | 12/1952 | Harvey | 396/396 |
| 2,652,209 | 9/1953 | Hodges | 396/396 |
| 2,792,744 | 5/1957 | Hirsch | 356/419 |
| 2,917,981 | * 12/1959 | Sewig | 396/284 X |
| 3,166,672 | * 1/1965 | Gardner | 359/889 X |
| 3,174,231 | * 3/1965 | Schure | 359/889 X |
| 3,248,050 | * 4/1966 | Dickson | 359/890 |
| 3,388,490 | 6/1968 | Stechemesser | 40/406 |
| 4,268,150 | 5/1981 | Chen | 396/284 X |
| 5,005,035 | 4/1991 | Pagano | 396/284 X |
| 5,832,322 | 11/1998 | Zawodny et al. | 396/284 |

* cited by examiner

Primary Examiner—W. B. Perkey
(74) Attorney, Agent, or Firm—Roger A. Fields

(57) ABSTRACT

A camera has a rear cover part, a label on the rear cover part, and a numerical scale of exposure count indicia to be successively viewed. The numerical scale of exposure count indicia is located on the label, and each of the indicia has the same color. A color-absorbing optical filter is rotatable superimposed to the indicia and is a color that absorbs the color of the indicia to render the indicia invisible in order to prevent them from being viewed through the filter when light is reflected from the indicia to the filter. The filter includes a viewing portion that is arranged to be superimposed successively to the indicia when the filter is rotated and does not absorb the color of the indicia. As a result, the indicia are successively visible through the viewing portion in order to permit them to be successively viewed. Eye-readable information on the label is a color that is transmitted through the filter to permit the information to be read when light is reflected from the information to the filter.

11 Claims, 2 Drawing Sheets

EXPOSURE COUNT INDICATOR FOR CAMERA

CROSS REFERENCE TO RELATED APPLICATION

Reference is made to commonly assigned copending application Serial No. 09/443,900, entitled EXPOSURE COUNT INDICATOR FOR CAMERA and filed Nov. 19, 1999, in the name of Loretta E. Allen.

FIELD OF THE INVENTION

The invention relates generally to the field of photography, and in particular to an exposure count indicator for a camera.

BACKGROUND OF THE INVENTION

Practically every camera that is available today includes an exposure count indicator. Typically, the exposure count indicator provides a visible indication of the number of frames that remain available to be exposed on a filmstrip in the camera, i.e. the current number of exposures that can be made on the filmstrip. Conversely, the exposure count indicator can provide a visible indication of the number of frames actually exposed on the filmstrip, i.e. the number of exposures actually made. In either case, the exposure count indicator includes a numerical scale of successive exposure count indicia that are evenly spaced from one another. The scale of indicia range from the number "1" which indicates either that only one frame remains available to be exposed on the filmstrip, or only one frame has been actually exposed, to a higher number which is the maximum number of exposures, for example "15", "24" or "40". See prior art U.S. Pat. No. 5,832,322 issued Nov. 3, 1998.

THE CROSS-REFERENCED APPLICATION

The cross-referenced application discloses a camera having a rear cover part, and a rotatable counter dial with a numerical scale of exposure count indicia to be successively viewed. Each of the indicia has the same color. A label on the rear cover part is superimposed to the counter dial and has the same color as the indicia to render the indicia invisible in order to prevent them from being viewed. The label includes a viewing portion that is not the same color as the indicia and is arranged to be superimposed successively to the indicia when the counter dial is rotated. As a result, the indicia are made successively visible in order to permit them to be successively viewed. Eye-readable information is imprinted on the label, and the counter dial is transparent to permit the information to be visible through the counter dial in order to be read.

SUMMARY OF THE INVENTION

An exposure count indicator comprising a numerical scale of exposure count indicia to be successively viewed, is characterized in that:

each of the indicia has the same color;

a color-absorbing optical filter is superimposed to the indicia and has a color that absorbs the color of the indicia to render the indicia invisible in order to prevent them from being viewed through the filter when light is reflected from the indicia to the filter, and includes a viewing portion that does not absorb the color of the indicia to allow only one of the indicia which is superimposed to the viewing portion to be visible through the viewing portion in order to permit that indicia to be viewed; and the indicia and the filter are supported for movement of one relative to the other for the indicia to be successively superimposed to the viewing portion, whereby the indicia can be successively viewed through the viewing portion.

DETAILED DESCRIPTION OF THE INVENTION

The invention is disclosed as being embodied preferably in so-called a one-time-use or single-use disposable camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
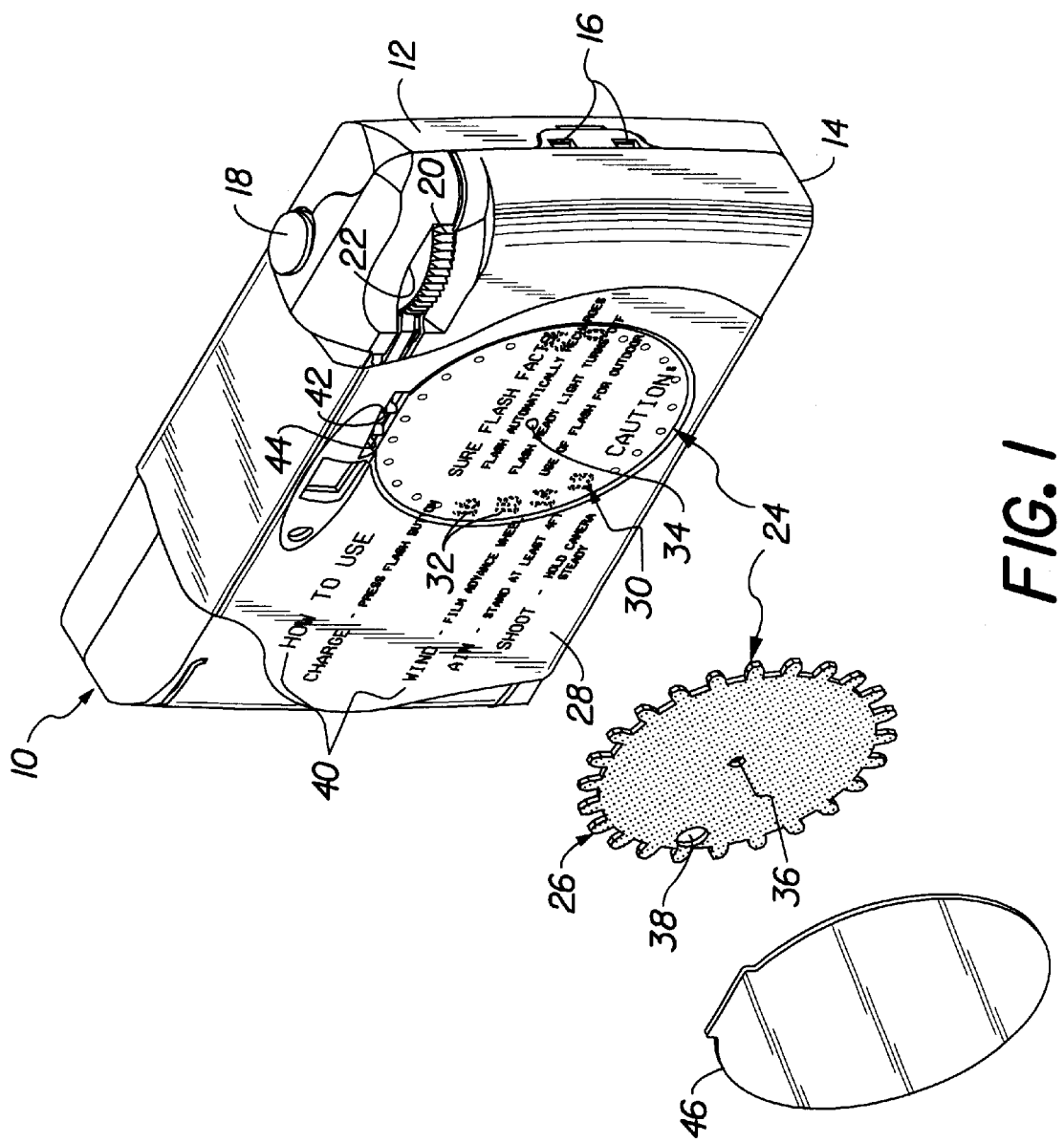
FIG. 1 is an exploded rear perspective view of a camera with an exposure count indicator according to a preferred embodiment of the invention.
Figure 2:
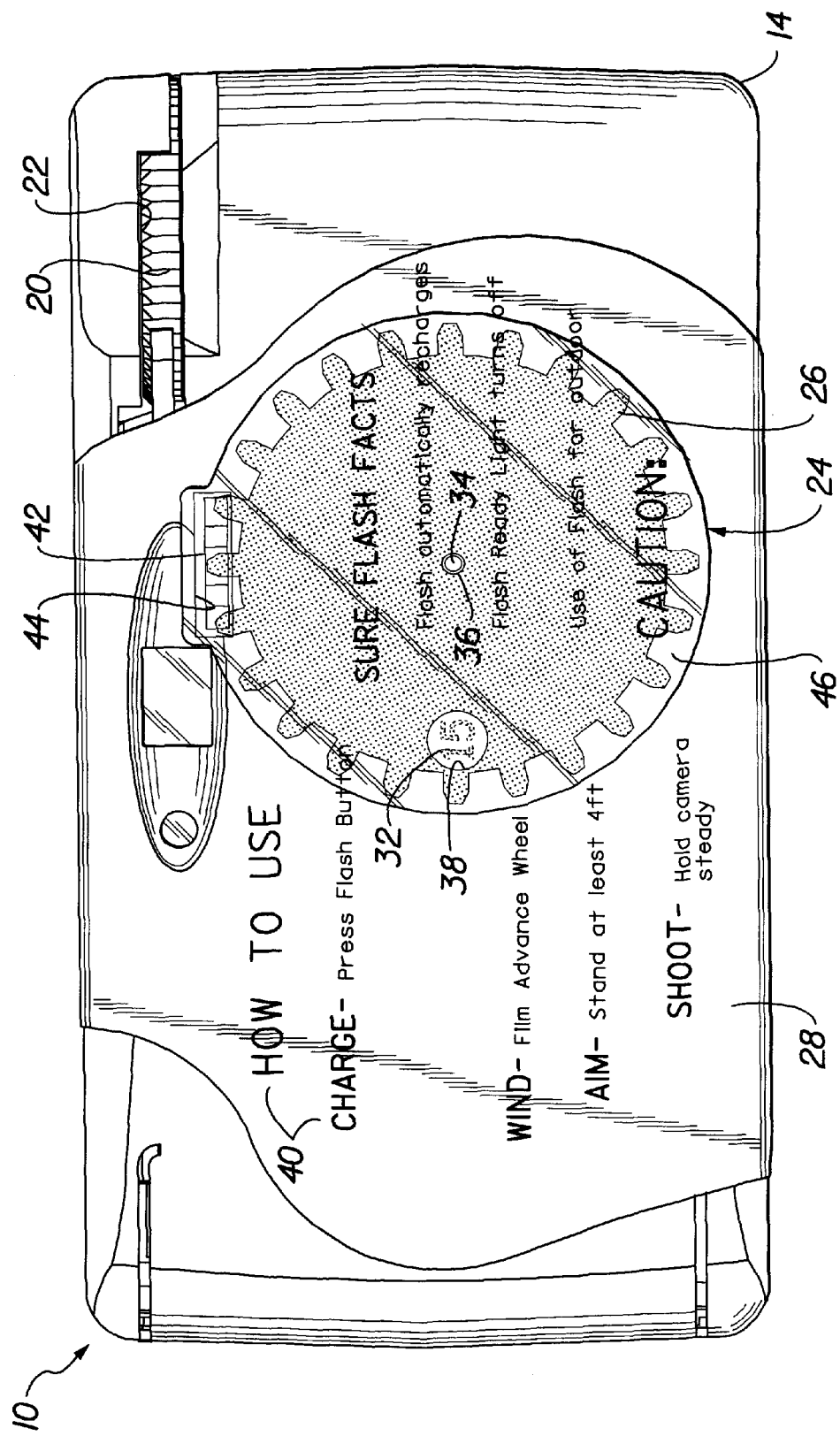
FIG. 2 is a rear elevation view of the camera.

Referring now to the drawings, FIGS. 1 and 2 show a one-time-use camera 10. The one-time-use camera 10 includes a plastic opaque main body part (not shown), a plastic opaque front cover part 12, and a plastic opaque rear cover part 14. The term "opaque" is used in the conventional sense as defined in the dictionary, i.e. "not pervious to light". The front cover part 12 and the rear cover part 14 house the main body part between them and are connected releasably to one another and to the main body part via known flexible hook-in-hole connections 16.

As is well known, the main body part has a rearwardly open cartridge receiving chamber for a conventional film cartridge and a rearwardly open film supply chamber for an unexposed filmstrip. The unexposed filmstrip, except for a trailing end portion in the film cartridge, is wound into an unexposed film roll on a rotatable film supply spool in the film supply chamber. A rearwardly open, rectangular-shaped backframe (exposure) opening is located intermediate the cartridge receiving chamber and the film supply chamber for exposing successive frames of the filmstrip. This exposure is initiated by manually depressing a release button 18, which causes a shutter to be opened in order to allow ambient light to be received through a front taking lens on the main body part. A manual film winder or film winding thumbwheel 20, rotatably supported on the main body part, above the cartridge receiving chamber, radially protrudes partially from an elongate narrow opening 22 in the rear cover part 14 and has a depending coaxial stem (not shown) in coaxial engagement with an exposed top end of a film take-up spool inside the film cartridge in the cartridge receiving chamber. The film winding thumbwheel 20 is manually grasped or fingered to rotate the thumbwheel in a film winding direction, counter-clockwise in FIGS. 1 and 2, to similarly rotate the film take-up spool inside the film cartridge. This is done in order to wind an exposed frame of the filmstrip from the backframe opening into the film cartridge and to move a fresh unexposed frame of the filmstrip from the unexposed film roll on the film supply spool in the film supply chamber to the backframe opening. The rewinding movement of the filmstrip the equivalent of slightly more than one frame width of the filmstrip rotates a metering sprocket in engagement with successive perforations in the filmstrip to pivot a metering lever into engagement with the thumbwheel 20 in order to prevent further manual rotation of the thumbwheel. Manually depressing the release button 18 to expose one of the frames pivots the metering lever out of engagement with the thumbwheel 20 to then permit renewed rotation of the thumbwheel.

An exposure count indicator 24 for providing a visible indication of the number of frames that remain to be exposed on the filmstrip is shown in FIGS. 1 and 2.

The exposure count indicator 24 includes a peripherally toothed color-absorbing optical filter disk 26 such as a well known Wratten filter, a label or background 28 facing rearward on the rear cover part 14, and a numerical scale 30 of successive exposure count indicia 32 that are evenly spaced from one another in a circle on the label and range from the number "24 to the number "0". Placing the indicia 32 on the label 28, facing rearward, makes it easy to view the indicia. Further advantages of this placement are described in prior art U.S. Pat. No. 5,832,322.

The filter disk 26 is rotatably supported on a fixed pin 34 that projects from the rear cover part 14 into a center bearing hole 36 in the filter disk. This enables the filter disk 26 to be rotated superimposed to the label 28 including the indicia 32.

Each of the indicia 32 is opaque and has exactly the same color (same hue, brightness, lightness and saturation). The filter disk 26 is transparent and is a color that absorbs the color of the indicia 32 to render the indicia invisible in order to prevent them from being viewed through the filter disk when light is reflected from the indicia to the filter disk. . The term "transparent" is used in the conventional sense as defined in a dictionary, i.e. "having the property of transmitting light without appreciable scattering so that bodies beyond are entirely visible". The filter disk 26 includes a viewing portion preferably in the form of a viewing hole 38 that is arranged to be superimposed successively to the indicia 32 when the filter disk is rotated. Because the viewing hole 38 does not, like the remainder of the filter disk 26, absorb the color of the indicia 32, the indicia are successively visible through the viewing hole in order to permit the indicia to be viewed.

The label 28 includes eye-readable information 40 which is opaque and a color that is transmitted through (not absorbed by the color of) the filter disk 26 to permit the information to be visible through the filter disk in order to be read when light is reflected from the information to the filter disk. The label 28 has a different color than the filter disk 26, the indicia 32 and the information 40, but like the indicia is one that the filter disk absorbs.

Four examples of suitable colors for the filter disk 26, the label 28, the indicia 32 and the information 40 are as follows:

EXAMPLE 1

The color of the filter disk 26 is red, the color of the indicia 32 is one selected from the group of colors blue, green, and black, and the color of the information 40 is white. The term "black" is used in the conventional sense as defined in the dictionary, i.e. "the achromatic color of least lightness characteristically perceived to belong to objects that neither reflect not transmit light. The term "white" is used in the conventional sense as defined in the dictionary, i.e. "the achromatic object color of greatest lightness characteristically perceived to belong to objects that reflect diffusely nearly all light throughout the visible spectrum".

The color of the label 28 is green when the color of the indicia 32 is blue. The color of the label 28 is blue when the color of the indicia 32 is green. The color of the label 28 is either blue or green when the color of the indicia 32 is black.

EXAMPLE 2

The color of the filter disk 26 is green, the color of the indicia 32 is one selected from the group of colors blue, red, and black, and the color of the information 40 is white.

The color of the label 28 is red when the color of the indicia 32 is blue, is blue when the color of the indicia is red and is either blue or red when the color of the indicia is black.

EXAMPLE 3

The color of the filter disk 26 is blue, the color of the indicia 32 is one selected from the group of colors green, red, and black, and the color of the information 40 is white.

The color of the label 28 is red when the color of the indicia 32 is green, is green when the color of the indicia is red and is either green or red when the color of the indicia is black.

EXAMPLE 4

The color of the filter disk 26 is yellow, the color of the indicia 32 is one selected from the group of colors blue and black, and the color of the information 40 is white.

The color of the label 28 is black when the color of the indicia 32 is blue and is blue when the color of the indicia is black.

In each of the Examples 1–4, the filter disk 26 is a color that absorbs the color of the indicia 32 to render the indicia invisible when light is reflected from the indicia to the filter disk. The color of the information 40 is one that is transmitted through the filter disk to permit the information to be visible through the filter disk when light is reflected from the information to the filter disk.

Various Wratten filters that can be used for the filter disk 26 are No. 25 red, No. 58 green, No. 48 deep blue, and No. 12 deep yellow.

A peripherally toothed sprocket wheel 42 rotatably supported on the main body part, above the backframe (exposure) opening in the main body part, radially protrudes partially from an elongate narrow opening 44 in the rear cover part 14 to rotationally engage the filter disk 26. The sprocket wheel 42 is slightly rotated via known suitable gearing (not shown) in response to incremental film movement within the main body part. Each time the thumbwheel 20 is manually rotated in the film winding direction, counter-clockwise in FIGS. 1 and 2, to wind an exposed frame of the filmstrip from the backframe opening into the film cartridge in the cartridge receiving chamber in the main body part and to move a fresh unexposed frame of the filmstrip from the unexposed film roll on the film supply spool in the film supply chamber in the main body part to the backframe opening, the filter disk 26 is rotated counter-clockwise in FIGS. 1 and 2, via the sprocket wheel 42, to move the viewing hole 38 immediately over the next lower one of the indicia 32. The indicia, shown in FIG. 2 as the number "15", is then visible through the viewing hole 38 to permit it to be viewed.

Alternatively, the filter disk 26 can be rotated in a manner such as disclosed in prior art U.S. Pat. No. 5,832,322.

A protective cover 46 which is transparent and colorless is fixed to the rear cover part 14 over the filter disk 26 as shown in FIGS. 1 and 2.

The invention has been described with reference to a preferred embodiment. However, it will be appreciated that variations and modifications can be effected by a person of ordinary skill in the art without departing from the scope of the invention. For example, the filter disk 26 can be non-rotatable and instead the indicia 32 can be rotated to be successively visible at the viewing hole 38. Moreover, the viewing hole 38 can be filled with a transparent colorless magnifying lens.

Parts List 10. one-time-use camera
12. front cover part
14. rear cover part
16. hook-in-hole connection
18. release button
20. film winding thumbwheel
22. elongate narrow opening
24. exposure count indicator
26. filter disk
28. label or background
30. numerical scale
32. indicia
34. fixed pin
36. center bearing hole
38. viewing portion or hole
40. eye-readable information
42. sprocket wheel
44. elongate narrow opening
46. protective cover

What is claimed is:

1. An exposure count indicator comprising a numerical scale of exposure count indicia to be successively viewed, is characterized in that:

each of said indicia has the same color;

a color-absorbing optical filter is superimposed to said indicia and has a color that absorbs the color of the indicia to render the indicia invisible in order to prevent them from being viewed through said filter when light is reflected from the indicia to the filter, and includes a viewing portion that does not absorb the color of said indicia to allow only one of the indicia which is superimposed to said viewing portion to be visible through the viewing portion in order to permit that indicia to be viewed; and said indicia and said filter are supported for movement of one relative to the other for said indicia to be successively superimposed to said viewing portion, whereby said indicia can be successively viewed through said viewing portion.

2. An exposure count indicator as recited in claim 1, wherein said viewing portion is colorless.

3. An exposure count indicator as recited in claim 1, wherein the color of said filter is selected from the group of colors red, blue and green.

4. An exposure count indicator as recited in claim 1, wherein a background includes said indicia and is a different color than said indicia and said filter but like the color of the indicia is one that the filter absorbs.

5. An exposure count indicator as recited in claim 4, wherein the color of said filter is red, the color of said indicia is one selected from the group of colors blue, green, and black, and the color of said background is green when the color of said indicia is blue, is blue when the color of said indicia is green and is either blue or green when the color of said indicia is black.

6. An exposure count indicator as recited in claim 4, wherein the color of said filter is green, the color of said indicia is one selected from the group of colors blue, red, and black, and the color of said background is red when the color of said indicia is blue, is blue when the color of said indicia is red and is either blue or red when the color of said indicia is black.

7. An exposure count indicator as recited in claim 4, wherein the color of said filter is blue, the color of said indicia is one selected from the group of colors green, red, and black, and the color of said background is red when the color of said indicia is green, is green when the color of said indicia is red and is either green or red when the color of said indicia is black.

8. An exposure count indicator as recited in claim 4, wherein said background includes eye-readable information which is a color that is transmitted through said filter to permit said information to be visible through the filter in order to be read when light is reflected from said information to the filter.

9. A camera comprising a rear cover part, a label on said rear cover part, and a numerical scale of exposure count indicia to be successively viewed, is characterized in that:

said numerical scale of exposure count indicia is located on said label, and each of said indicia has the same color; and a color-absorbing optical filter is rotatable superimposed to said indicia and is a color that absorbs the color of the indicia to render the indicia invisible in order to prevent them from being viewed through said filter when light is reflected from the indicia to the filter, and includes a viewing portion that is arranged to be superimposed successively to said indicia when said filter is rotated and does not absorb the color of said indicia, whereby said indicia are successively visible through said viewing portion in order to permit them to be successively viewed.

10. A camera as recited in claim 9, wherein said label includes eye-readable information which is a color that is transmitted through said filter to permit said information to be visible through the filter in order to be read when light is reflected from said information to the filter.

11. A camera as recited in claim 10, wherein said label is a different color than said indicia, said filter and said information but like the color of the indicia and is one that the filter absorbs.

* * * * *